(12) United States Patent
Kim et al.

(10) Patent No.: US 11,479,077 B2
(45) Date of Patent: Oct. 25, 2022

(54) HEAT PUMP SYSTEM FOR VEHICLE

(71) Applicants: HYUNDAI MOTOR COMPANY, Seoul (KR); KIA CORPORATION, Seoul (KR)

(72) Inventors: Jeawan Kim, Gwangmyeong-si (KR); Jae Yeon Kim, Hwaseong-si (KR); Yeonho Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 45 days.

(21) Appl. No.: 17/317,459

(22) Filed: May 11, 2021

(65) Prior Publication Data
US 2022/0088991 A1    Mar. 24, 2022

(30) Foreign Application Priority Data

Sep. 24, 2020  (KR) .................. 10-2020-0123943

(51) Int. Cl.
| | | |
|---|---|---|
| *B60H 1/32* | (2006.01) | |
| *B60H 1/00* | (2006.01) | |
| *B60H 1/03* | (2006.01) | |

(52) U.S. Cl.
CPC ..... *B60H 1/00278* (2013.01); *B60H 1/00392* (2013.01); *B60H 1/00485* (2013.01); *B60H 1/03* (2013.01); *B60H 1/3227* (2013.01); *B60H 1/32284* (2019.05); *B60H 2001/00307* (2013.01)

(58) Field of Classification Search
CPC ............ B60H 1/00278; B60H 1/32284; B60H 1/00392; B60H 1/00485; B60H 1/03; B60H 1/3227; B60H 2001/00307
See application file for complete search history.

(56) References Cited

U.S. PATENT DOCUMENTS

| | | | |
|---|---|---|---|
| 9,441,865 B2 | 9/2016 | Atsushi et al. | |
| 10,661,631 B2 | 5/2020 | Kawano | |
| 11,318,816 B2 * | 5/2022 | Kim ................... | B60H 1/32281 |

FOREIGN PATENT DOCUMENTS

| | | |
|---|---|---|
| KR | 10-1558314 B1 | 10/2015 |
| KR | 2020-0040432 A | 4/2020 |

* cited by examiner

*Primary Examiner* — Davis D Hwu
(74) *Attorney, Agent, or Firm* — McDonnell Boehnen Hulbert & Berghoff LLP

(57) ABSTRACT

A heat pump system for a vehicle according to an embodiment of the present disclosure may control a temperature of a battery module by using one chiller in which a refrigerant and a coolant are heat-exchanged, may recover waste heat generated from an electrical component and the battery module to use it for indoor heating, thereby improving the heating performance and efficiency, and may increase a flow rate of the refrigerant by applying a gas injection part that selectively operates in a heating mode of a vehicle, thereby maximizing heating performance.

20 Claims, 6 Drawing Sheets

HEAT PUMP SYSTEM FOR VEHICLE

CROSS REFERENCE TO RELATED APPLICATIONS

This application claims priority to and the benefit of Korean Patent Application No. 10-2020-0123943 filed in the Korean Intellectual Property Office on Sep. 24, 2020, the entire contents of which are incorporated herein by reference.

BACKGROUND

(a) Field

The present disclosure relates to a heat pump system for a vehicle. More particularly, the present disclosure relates to a heat pump system for a vehicle that may use one chiller in which a refrigerant and a coolant are heat-exchanged to control a temperature of a battery module and a temperature of an autonomous driving controller, and may use waste heat generated from an electrical component, a battery module, and an autonomous driving controller to improve heating performance and efficiency.

(b) Description of the Related Art

Generally, an air conditioner system for a vehicle includes an air conditioner for circulating a refrigerant to heat or cool an interior of the vehicle.

The air conditioner system, which may maintain a fresh indoor condition by maintaining an indoor temperature of a vehicle at an appropriate temperature regardless of an outdoor temperature change, is configured to heat or cool an interior of the vehicle by heat-exchange by a condenser and an evaporator during a process in which a refrigerant discharged by driving a compressor is circulated to the compressor again by passing through the condenser, a receiver drier, an expansion valve, and the evaporator.

That is, in the air conditioner system, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as concern about energy efficiency and environmental pollution has gradually increased, development of an environmentally-friendly vehicle capable of being substantially substituted for a vehicle having an internal combustion engine has been required, and the environmentally-friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally-friendly vehicles, a separate heater is not used, unlike an air conditioner of a general vehicle, and an air conditioner, which is applied to the environmentally-friendly vehicle, is typically referred to as a heat pump system.

In a case of the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell.

Even in the hybrid vehicle, the driving force is generated by driving the motor by using electricity supplied from the fuel cell or the electric battery together with the engine that is actuated with a general fuel, and as a result, the performance of the motor can be secured only by effectively removing the heat generated from the fuel cell or the battery, and the motor.

Accordingly, in a hybrid vehicle or electric vehicle of a prior art, a battery cooling system, a cooling part, and a heat pump system should be configured to have respective separate circuits to prevent heat generation of a motor, electrical components, and a battery including a fuel cell.

Thus, a size and a weight of a cooling module disposed in the front of the vehicle are increased, and a layout of connecting pipes for supplying a refrigerant or coolant to the heat pump system, the cooling part, and the battery cooling system inside an engine compartment becomes complicated.

In addition, since the battery cooling system for heating or cooling the battery is separately provided according to a state of the vehicle so that the battery may operate in an optimal state, a plurality of valves for connecting the respective connecting pipes are applied, thus noise and vibration are transmitted to the interior of the vehicle, resulting in poor ride comfort.

In addition, when heating the interior of the vehicle, the heating performance decreases due to a lack of a heat source, the amount of electricity consumption increases due to the use of an electric heater, and the power consumption of the compressor increases.

The above information disclosed in this Background section is only for enhancement of understanding of the background of the disclosure, and therefore it may contain information that does not form the prior art that is already known in this country to a person of ordinary skill in the art.

SUMMARY

Therefore, the present disclosure has been made in an effort to provide a heat pump system for a vehicle that may use one chiller in which a refrigerant and a coolant are heat-exchanged to control a temperature of a battery module and a temperature of an autonomous driving controller, and may improve heating performance and efficiency by recovering waste heat generated from an electrical component, a battery module, and an autonomous driving controller and using it for interior heating.

In addition, the present disclosure has been made in an effort to provide a heat pump system for a vehicle that may maximize heating performance by applying a gas injection part that selectively operates in a heating mode of a vehicle to increase a flow rate of a refrigerant.

An embodiment of the present disclosure provides a heat pump system for a vehicle, including a first cooling apparatus including a first radiator, a first water pump, and a first valve that are connected by a first coolant line, and circulating a first coolant in the first coolant line to cool at least one electrical component provided in the first coolant line, a second cooling apparatus including a second radiator and a second water pump connected by a second coolant line, and circulating a second coolant in the second coolant line, a third cooling apparatus including a third coolant line selectively connected through the second coolant line and a second valve, and a third water pump, a battery module, and an autonomous driving controller provided in the third coolant line, and circulating the second coolant in the battery module and the autonomous driving controller, a chiller that is provided in the third coolant line so that the second coolant passes through the inside thereof, is connected through a refrigerant line and a refrigerant connection line of an air conditioner, is connected through a refrigerant line and a refrigerant connection line of an air conditioner, and heat-exchanging the second coolant selectively flowing through the third coolant line with a refrigerant selectively supplied from the air conditioner to control a temperature of the second coolant, and a gas injection part provided in the air conditioner and increasing a flow rate of the refrigerant circulating in the refrigerant line by bypassing some of the refrigerant passing through an internal condenser to a compressor, wherein a heat-exchanger included in the air conditioner may be connected to each of the first and second coolant lines so that each coolant circulating in the first and second cooling apparatuses passes therethrough.

The air conditioner may include an HVAC module including an evaporator connected thereto through the refrigerant line, and an opening/closing door that controls to selectively flow external air passing through the evaporator into the internal condenser according to cooling, heating, and dehumidifying modes of the vehicle, a compressor connected thereto between the evaporator and the internal condenser through the refrigerant line, a first expansion valve provided in the refrigerant line connecting the heat-exchanger and the evaporator, a second expansion valve provided in the refrigerant connection line, and an accumulator provided in the refrigerant line between the evaporator and the compressor and connected to the refrigerant connection line.

The second expansion valve, when cooling the battery module by using a coolant heat-exchanged with a refrigerant, may expand a refrigerant flowing through the refrigerant connection line to flow it into the chiller.

The gas injection part may include a gas-liquid separator provided in the refrigerant line between the internal condenser and the heat exchanger, and separating and selectively discharging a gaseous refrigerant and a liquid refrigerant among the refrigerant that have passed through the internal condenser, a bypass line connecting the gas-liquid separator and the compressor, and selectively supplying the gaseous refrigerant from the gas-liquid separator to the compressor, a bypass valve provided in the bypass line, a third expansion valve provided in the refrigerant line between the internal condenser and the gas-liquid separator, and a fourth expansion valve provided in the refrigerant line between the gas-liquid separator and the heat-exchanger.

When the gas injection part is operated in a heating mode of the vehicle, the third expansion valve may expand a refrigerant supplied from the internal condenser to supply it to the gas-liquid separator, and the fourth expansion valve may expand a refrigerant supplied from the gas-liquid separator to flow to the refrigerant line.

When the gas injection part is not operated in a heating mode of vehicle, the third expansion valve may pass a refrigerant supplied from the internal condenser, and the fourth expansion valve may expand a refrigerant that has passed through the gas-liquid separator to supply it to the heat-exchanger.

In a cooling or dehumidifying mode of the vehicle, the third and fourth expansion valves may not expand a refrigerant supplied from the internal condenser but may flow it through the refrigerant line.

The bypass valve, when the gas injection part is operated, may operate so that the bypass line is opened.

The first, second, third, and fourth expansion valves may be electronic expansion valves that selectively expand a refrigerant while controlling flowing of the refrigerant.

The heat-exchanger may additionally condense or evaporate a refrigerant condensed in the internal condenser through heat-exchange with external air, according to a selective operation of the fourth expansion valve.

The air conditioner may further include a refrigerant branch line that selectively flows the refrigerant discharged from the heat-exchanger directly into the accumulator through an operation of a refrigerant valve provided in the refrigerant line between the heat-exchanger and the refrigerant connection line.

The refrigerant valve may open the refrigerant branch line in a heating mode of the vehicle.

The first cooling apparatus may be provided with a first branch line that is connected to the first coolant line between the first radiator and the first water pump through the first valve provided in the first coolant line between the first radiator and the first water pump, the third cooling apparatus may be provided with a second branch line that is connected to the third coolant line through the second valve so as to form a closed circuit independent from the second cooling apparatus, and the second cooling apparatus may be provided with a third branch line that separates the second coolant line and the third coolant line.

When cooling the battery module and the autonomous driving controller in a cooling mode of the vehicle, in the first cooling apparatus, the first branch line may be closed by the first valve, and the first coolant cooled by the first radiator is circulated in the electrical component by the first water pump, the second branch line may be opened by the second valve, and the third branch line is opened, the second coolant line and the third coolant line may be disconnected by the opened second and third branch lines, in the second cooling apparatus, the second coolant may be circulated in the third branch line and the second coolant line that are opened by the second water pump, and in the third cooling apparatus, the second coolant that has passed through the chiller by the third water pump is supplied to the battery module and the autonomous driving controller, in the air conditioner, the refrigerant may be circulated along the refrigerant line and the refrigerant connection line in a state in which the refrigerant connection line is opened by the second expansion valve, the first and second expansion valves may expand the refrigerant so that the expanded refrigerant is supplied to the evaporator and the chiller, respectively, and the refrigerant branch line may be closed by the refrigerant valve.

In the first cooling apparatus, the first coolant cooled by the first radiator may be supplied to the heat-exchanger by the first water pump, in the second cooling apparatus, the opened third branch line may be connected to the second coolant line to form a closed circuit independent from the third cooling apparatus, and the second coolant cooled by the second radiator may be supplied to the heat-exchanger by the second water pump; and the heat-exchanger may condense a refrigerant through heat-exchange with each coolant.

When recovering external heat and waste heat from the electrical component in a heating mode of the vehicle, the first branch line may be selectively opened or closed by the first valve, in the first cooling apparatus, the first coolant may be circulated in the electrical component by the first water pump, in a state in which the second coolant line and the third coolant line are disconnected by the second valve, the second branch line may be closed and the third branch line may be opened, in the second cooling apparatus, the second coolant may be circulated in the second coolant line and the opened third branch line by the second water pump, the third cooling apparatus may stop operation, in the air conditioner, a refrigerant line connecting the heat-exchanger and the evaporator may be closed by the first expansion valve, the refrigerant connection line may be closed by the second expansion valve, the refrigerant branch line may be opened by the refrigerant valve, and the heat-exchanger may heat-exchange the refrigerant supplied from the internal condenser with the first coolant of which temperature has risen while cooling the electrical component, and may condense the refrigerant, so that the refrigerant may recover waste heat of the electrical component.

When the gas injection part operates while recovering external heat and waste heat from the electrical component in a heating mode of the vehicle, the first branch line may be selectively opened or closed by the first valve, in the first cooling apparatus, the first coolant may be circulated in the electrical component by the first water pump, in a state in which the second coolant line and the third coolant line are disconnected by the second valve, the second branch line may be closed and the third branch line may be opened, in the second cooling apparatus, a second coolant may be circulated in the second coolant line and the opened third branch line by the second water pump, the third cooling apparatus may stop operation, in the air conditioner, a refrigerant line connecting the heat-exchanger and the evaporator may be closed by the first expansion valve, the refrigerant connection line may be closed by the second expansion valve, the refrigerant branch line may be opened by the refrigerant valve, in the gas injection part, the bypass line may be opened by the bypass valve, the third expansion valve may expand the refrigerant to supply it to the gas-liquid separator, and the fourth expansion valve may expand the refrigerant passing through the gas-liquid separator, and the heat-exchanger may recover waste heat from the electrical component by evaporating the refrigerant expanded while passing through the fourth expansion valve, through heat-exchange between the refrigerant expanded while passing through the fourth expansion valve and the first coolant of which temperature has risen while cooling the electrical component.

In a dehumidifying mode of the vehicle, the first branch line may be closed by the first valve, in the first cooling apparatus, the first coolant may be circulated in the electrical component by the first water pump, in the second cooling apparatus, in a state in which the third branch line is opened, the second coolant may be circulated in the second coolant line by the second water pump, the third cooling apparatus may stop operation, in the air conditioner, the refrigerant line connected to the evaporator may be opened by the first expansion valve, the refrigerant connection line may be closed by the second expansion valve, and the refrigerant branch line may be closed by the refrigerant valve.

When cooling the electrical component, the battery module, and the autonomous driving controller, the first branch line may be closed by the first valve, the second valve may connect the second coolant line and the third coolant line, and may close the second branch line, the third branch line may be closed, the first coolant cooled by the first radiator may be supplied to the electrical component along the first coolant line by the first water pump, and the second coolant cooled by the second radiator may be supplied to the battery module and the autonomous driving controller along the second and third coolant lines by the second and third water pumps.

The electrical component may include a power control device, an inverter, an on board charger (OBC), or a power converter.

The heat-exchanger may be a water-cooled heat-exchanger.

As described above, according to the heat pump system for the vehicle according to the embodiment of the present disclosure, simplification and miniaturization of the system may be realized, by using one chiller in which a refrigerant and a coolant are heat-exchanged to control a temperature of a battery module and a temperature of an autonomous driving controller.

In addition, according to the embodiment of the present disclosure, by efficiently controlling a temperature of a battery module, it is possible to operate the battery module at optimal performance, and a total mileage of the vehicle may be increased through efficient management of the battery module.

In addition, according to the embodiment of the present disclosure, it is possible to improve heating efficiency by selectively using an external heat source or waste heat from an electrical component in a heating mode of a vehicle.

In addition, according to the embodiment of the present disclosure, it is possible to maximize heating performance by selectively increasing a flow rate of refrigerant in a heating mode of a vehicle by applying a gas injection part.

Furthermore, according to the embodiment of the present disclosure, it is possible to reduce manufacturing cost and weight through simplification of an entire system, and to improve space utilization.

DETAILED DESCRIPTION

Figure 1:
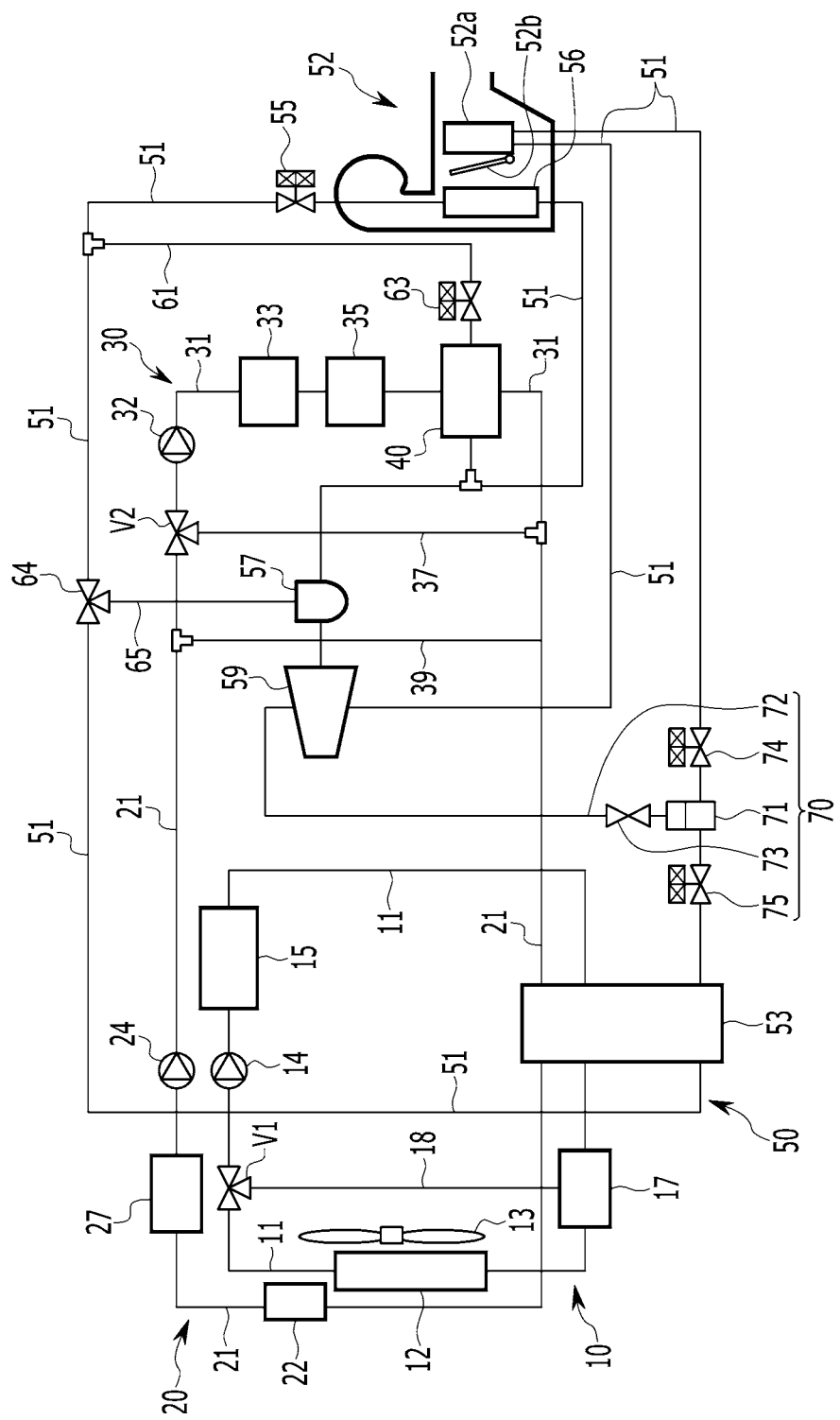
FIG. 1 illustrates a block diagram of a heat pump system for a vehicle according to an embodiment of the present disclosure.

An embodiment of the present disclosure will hereinafter be described in detail with reference to the accompanying drawings.

Since the embodiments described in the specification and the configurations shown in the drawings are merely the most preferable embodiments and configurations of the present disclosure, they do not represent all of the technical ideas of the present disclosure, and it should be understood that that various equivalents and modified examples, which may replace the embodiments, are possible when filing the present application.

In order to clearly describe the present disclosure, parts that are irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

FIG. 1 illustrates a block diagram of a heat pump system for a vehicle according to an embodiment of the present disclosure.

A heat pump system for a vehicle according to an embodiment of the present disclosure may adjust a temperature of a battery module 25 by using one chiller 30 in which a refrigerant and a coolant are heat-exchanged, and it may use an external heat source or waste heat of an electrical component 15, and a gas injection part 70, thereby improving heating performance and efficiency.

Here, in the heat pump system of an electric vehicle, first and second cooling apparatuses 10 and 20 for cooling the electrical component 15, a third cooling apparatus 30 for cooling the battery module 25 and an autonomous driving controller 26, and an air conditioner 50 that is an air conditioning apparatus for cooling and heating an interior may be mutually interconnected.

That is, referring to FIG. 1, the heat pump system may include the first cooling apparatus 10, the second cooling apparatus 20, the third cooling apparatus 30, a chiller 40, and the air conditioner 50.

First, the first cooling apparatus 10 includes a first radiator 12, a first water pump 14, a first valve V1, and a first reservoir tank 17 connected by a first coolant line 11.

The first radiator 12 is disposed at the front of the vehicle, and a cooling fan 13 is provided at the rear thereof, and the coolant is cooled through an operation of the cooling fan 13 and heat-exchange with the outside air.

In addition, the electrical component 15 may include a power conversion device such as an electric power control unit (EPCU), a motor, an inverter, or an on board charger (OBC).

The electric power control unit, the inverter, or the motor heats up while driving, and the charger may heat up when charging the battery module 25.

The electrical component 15 configured as described above may be provided in the first coolant line 11 to be cooled in a water-cooled manner.

That is, when the waste heat of the electrical component 15 is recovered in the heating mode of the vehicle, the heat generated from the power conversion device such as the EPCU, the motor, the inverter, or the OBC may be recovered.

Meanwhile, the first reservoir tank 17 is provided in the first coolant line 11 between the first radiator 12 and the electrical component 15. The coolant cooled by the first radiator 12 may be stored in the first reservoir tank 17.

The first cooling apparatus 10 configured as described above may circulate the coolant in the first coolant line 11 so that the coolant may be supplied to the electrical component 15 provided in the first coolant line 11.

That is, the first cooling apparatus 10 circulates the coolant cooled by the first radiator 12 along the first coolant line 11 through the operation of the first water pump 14, thereby cooling the electrical component 15 so as to not overheat.

In the present embodiment, the second cooling apparatus 20 may include a second radiator 22 and a second water pump 24 connected by a second coolant line 21.

The second cooling apparatus 20 may circulate the coolant cooled by the second radiator 22 in the second coolant line 21 through the operation of the second water pump 24.

Here, the second radiator 22 is disposed on the same line as the first radiator 12, and the coolant is cooled through the operation of the cooling fan 13 and heat-exchange with the outside air.

Meanwhile, it is described in the present embodiment that the second radiator 22 is disposed on the same line as the first radiator 12, but the present disclosure is not limited thereto, and the first and second radiators 12 and 22 may be integrally configured.

In addition, a second reservoir tank 27 is provided in the second coolant line 21 between the second radiator 22 and the second water pump 24. The coolant cooled by the second radiator 22 may be stored in the second reservoir tank 27.

The second cooling apparatus 20 configured as described above may circulate the coolant through the operation of the second water pump 24.

In the present embodiment, the third cooling apparatus 30 includes a third coolant line 31 that is selectively connected to the second coolant line 21 through a second valve V2, and a third water pump 32, a battery module 33, and an autonomous driving controller 35 that are provided in the third coolant line 31.

This third cooling apparatus 30 may circulate the coolant in the battery module 33 and the autonomous driving controller 35 through an operation of the third water pump 32.

Here, the second valve V2 may selectively connect the second coolant line 21 and the third coolant line 31 between the second radiator 22 and the battery module 30.

More specifically, the second valve V2 selectively connects the second coolant line 21 and the third coolant line 31 between the third water pump 32 and the second radiator 22 provided in the third coolant line 31.

Here, the battery module 33 and the autonomous driving controller 35 supply power to the electrical component 15, and are formed to be cooled by a coolant flowing along the third coolant line 31.

That is, the battery module 33 and the autonomous driving controller 35 are selectively connected to the second cooling apparatus 20 through the third coolant line 31 according to the operation of the second valve V2. In addition, the battery module 33 may circulate the coolant therein through the operation of the third water pump 32 provided in the third coolant line 31.

The third water pump 32 is provided in the third coolant line 31 between the second valve V2 and the battery module 33. This third water pump 32 may be operated to circulate the coolant in the third coolant line 31.

Here, the first, second, and third water pumps 14, 24, and 32 may be electric water pumps.

Meanwhile, a first branch line 18 connected to the first coolant line 11 between the first radiator 12 and the first water pump 14 through the first valve V1 provided in the first coolant line 11 between the first radiator 12 and the first water pump 14, is provided in the first cooling apparatus 10.

More specifically, the first valve V1 is provided in the first coolant line 11 between the electrical component 15 and the first radiator 12.

One end of the first branch line 18 may be connected to the first coolant line 11 through the first valve V1, and the other end of the first branch line 18 may be connected to the first reservoir tank 17.

This first branch line 18 is selectively opened through the operation of the first valve V1 when the coolant temperature is raised by absorbing the waste heat generated from the electrical component 15. In this case, the first coolant line 11 connected to the first radiator 12 is closed through the operation of the first valve V1.

That is, while the waste heat from the electrical component 15 is recovered, the first branch line 18 may be selectively opened through the operation of the first valve V1 so that the coolant that passes through the electrical component 15 may be supplied back to the electrical component 15 without passing through the first radiator 12.

In the present embodiment, the chiller 40 is provided in the third coolant line 31, and the coolant may be selectively circulated therein.

The chiller 40 is connected to a refrigerant line 51 of the air conditioner 50 through a refrigerant connection line 61. That is, the chiller 40 may be a water-cooled heat-exchanger into which a coolant flows.

Accordingly, the chiller 40 heat-exchanges the coolant selectively flowing through the third coolant line 31 with the refrigerant selectively supplied from the air conditioner 50 to control the temperature of the coolant.

Meanwhile, the third cooling apparatus 30 is provided with a second branch line 37 connected to the third coolant line 31 through the second valve V2 to form an independent closed circuit from the second cooling apparatus 20.

When the waste heat of the battery module 33 and the autonomous driving controller 35 is recovered, or the temperature of the battery module 33 and the autonomous driving controller 35 is increased, the second branch line 37 may be selectively opened and closed through the operation of the second valve V2 so that the coolant that has passed through the battery module 33 and the autonomous driving controller 35 may be supplied back to the battery module 33 and the autonomous driving controller 35 without passing through the second radiator 22.

That is, the second valve V2 is provided between the second coolant line 21 and the third coolant line 31, and it may selectively connect the second coolant line 21 and the third coolant line 31.

Conversely, the second valve V2 may disconnect the second coolant line 21 and the third coolant line 31, and may open the second branch line 37.

When the second branch line 37 is opened, the third cooling apparatus 30 is separated from the second cooling apparatus 20, and may form an independent closed circuit.

In addition, the second cooling apparatus 20 is provided with a third branch line 39 disconnecting the second coolant line 21 and the third coolant line 31.

The third branch line 39 may be selectively connected to the second coolant line 21 so that the second cooling apparatus 20 may form an independent closed circuit through the second coolant line 21.

Meanwhile, a separate valve may be provided at a point at which the third branch line 39 crosses the second coolant line 21 and the third coolant line 31, or at the third branch line 39. This valve may be a 3-way or 2-way valve.

Here, the first valve V1 and the second valve V2 control the flow of the coolant in the first, second, and third cooling apparatus 10, 20, and 30 through the opening and closing control of the first and second branch lines 18 and 37.

First, when cooling the electrical component 15 by using the coolant cooled by the first radiator 12, the first valve V1 may open the first coolant line 11 connected to the first radiator 12 and close the first branch line 18.

Then, while the coolant cooled by the first radiator 12 is circulated along the first coolant line 11 connected thereto through the operation of the first valve V1, it may cool the electrical component 15.

Conversely, when recovering the waste heat from the electrical component 15, the first valve V1 may close the first coolant line 11 connected to the first radiator 12 and open the first branch line 18.

Then, the coolant circulated in the first cooling apparatus 10 passes through the electrical component 15 along the opened first coolant line 11 and the first branch line 18 without passing through the first radiator 12, thus the temperature may rise.

In addition, the second valve V2 selectively connects the second coolant line 21 and the third coolant line 31, or selectively connects the third coolant line 31 and the second branch line 37 to control the flow of the coolant.

That is, when cooling the battery module 33 and the autonomous driving controller 35 by using the coolant cooled by the second radiator 22, the second valve V2 may connect the second coolant line 21 and the third coolant line 31 connected to the second radiator 22, and may close the second branch line 37.

Then, while the coolant cooled by the second radiator 22 flows along the second coolant line 21 and the third coolant line 31 connected thereto through the operation of the second valve V2, the coolant may cool the battery module 33 and the autonomous driving controller 35.

In addition, when cooling the battery module 33 and the autonomous driving controller 35 by using the coolant heat-exchanged with the refrigerant in the chiller 40, the second valve V2 may open the second branch line 37, and may disconnect the second coolant line 21 and the third coolant line 31.

Accordingly, a low-temperature coolant in which the heat-exchange with the refrigerant in the chiller 40 is completed flows into the battery module 33 and the autonomous driving controller 35 through the second branch line 37 opened by the second valve V2, so that the battery module 33 and the autonomous driving controller 35 may be efficiently cooled.

In contrast, when increasing the temperature of the battery module 33, the battery module 33 may be quickly heated by preventing the coolant circulating along the third coolant line 31 from flowing into the second radiator 22 through the operation of the second valve V2.

On the other hand, in the present embodiment, the third branch line 39 is described as an example in which no valve is configured, but the present disclosure is not limited thereto, and in order to selectively open the third branch line 39, a valve may be applied thereto as needed.

That is, since the flow rate of the coolant circulated through the operations of the second coolant line 21, the third coolant line 31, and the second branch line 37, which are selectively connected according to respective modes (heating, cooling, and dehumidifying) of the vehicle, and through the operations of the second and third water pumps 24 and 32, may be controlled, and the opening/closing control of the third branch line 39 may be possible without applying a valve.

In the present embodiment, the air conditioner 50 includes an HVAC (heating, ventilation, and air conditioning) module 52 connected thereto through the refrigerant line 51, a heat-exchanger 53, a first expansion valve 55, an evaporator 56, an accumulator 57, a compressor 59, and a second expansion valve 63.

First, the HVAC module 52 includes the evaporator 56 connected thereto through the refrigerant line 51, and an opening/closing door 52b for controlling the external air passing through the evaporator 56 to selectively flow into an internal condenser 52a according to the cooling, heating, and heating/dehumidifying modes of the vehicle.

That is, the opening/closing door 52b is opened so that the external air that has passed through the evaporator 56 flows into the internal condenser 52a in the heating mode of the vehicle. In contrast, in the cooling mode of the vehicle, the opening/closing door 52b closes the internal condenser 52a side so that the external air cooled while passing through the evaporator 56 directly flows into the vehicle.

In the present embodiment, the heat-exchanger 53 is connected to the refrigerant line 51 so that the refrigerant passes therethrough. In addition, the heat-exchanger 53 may be connected to the first and second coolant lines 11 and 21, respectively, so that the coolants circulating in the first and second cooling apparatuses 10 and 20 may pass therethrough, respectively.

The heat-exchanger 53 may condense or evaporate the refrigerant through the heat-exchange with the coolant supplied through the first and second coolant lines 11 and 21 according to the vehicle mode. That is, the heat-exchanger 53 may be a water-cooled heat-exchanger into which a coolant flows.

The first expansion valve 55 is provided in the refrigerant line 51 between the heat-exchanger 53 and the evaporator 56. The first expansion valve 55 receives the refrigerant passed through the heat-exchanger 53 to selectively expand it.

The accumulator 57 is provided in the refrigerant line 51 between the evaporator 56 and the compressor 59, and is connected to the refrigerant connection line 61.

The accumulator 57 improves efficiency and durability of the compressor 59 by supplying only the gaseous refrigerant to the compressor 59.

In the present embodiment, one end of the refrigerant connection line 61 is connected to the refrigerant line 51 between the heat-exchanger 53 and the first expansion valve 55. In addition, the other end of the refrigerant connection line 61 may be connected to the accumulator 57.

Here, the accumulator 57 may supply the gaseous refrigerant of the refrigerant supplied through the refrigerant connection line 61 to the compressor 59.

Meanwhile, the second expansion valve 63 may be provided in the refrigerant connection line 61.

When cooling the battery module 33 and the autonomous driving controller 35 by using the coolant heat-exchanged with the refrigerant, the second expansion valve 63 may expand the refrigerant inflowing through the refrigerant connection line 61 to flow the refrigerant into the chiller 40.

Here, the second expansion valve 63 may operate even when the waste heat of the electrical component 15, or the waste heat of the battery module 33 and the autonomous driving controller 35, is recovered in the heating mode of the vehicle.

The second expansion valve 63 may selectively expand the refrigerant inflowing through the refrigerant connection line 61 to flow into the chiller 40.

That is, the second expansion valve 63 expands the refrigerant discharged from the heat-exchanger 53 to flow the refrigerant into the chiller 40 in a state of lowering the temperature, so that the temperature of the coolant passing through the inside of the chiller 40 may be further reduced.

Accordingly, the coolant whose temperature is reduced while passing through the chiller 40 may flow into the battery module 33 and the autonomous driving controller 36 to be more efficiently cooled.

The compressor 59 is connected between the evaporator 56 and the heat-exchanger 53 through the refrigerant line 51. The compressor 59 may compress the gaseous refrigerant, and may supply the compressed refrigerant to the heat-exchanger 53.

Meanwhile, in the present embodiment, the heat pump system may further include the gas injection part 70.

The gas injection part 70 is provided in the air conditioner 50. The gas injection part 70 may bypass some of the refrigerant that has passed through the internal condenser 52a to the compressor 59 to increase the flow rate of the refrigerant circulating in the refrigerant line 51.

The gas injection part 70 configured as described above may be selectively operated in the heating mode of the vehicle.

Conversely, the gas injection part 70 may be stopped in the cooling mode or dehumidifying mode of the vehicle.

Here, the gas injection part 70 includes a gas-liquid separator 71, a bypass line 72, a bypass valve 73, a third expansion valve 74, and a fourth expansion valve 75.

First, the gas-liquid separator 71 is provided in the refrigerant line 51 between the internal condenser 52a and the heat-exchanger 53.

The gas-liquid separator 71 may separate gaseous refrigerant and liquid refrigerant of the refrigerant completely heat-exchanged while passing through the internal condenser 52a to selectively discharge them.

The bypass line 72 connects the gas-liquid separator 71 and the compressor 59. The bypass line 72 may selectively supply the gaseous refrigerant from the gas-liquid separator 71 to the compressor 59.

That is, the bypass line 72 may connect the gas-liquid separator 71 and the compressor 59 so that the gaseous refrigerant that has passed through the gas-liquid separator 71 may selectively flow into the compressor 59.

In the present embodiment, the bypass valve 73 is provided in the bypass line 72. The bypass valve 73 may selectively open the bypass line 72 according to the vehicle mode.

That is, the bypass valve 73 may be operated so that the bypass line 72 may be opened when the gas injection part 70 is operated.

Here, the gas-liquid separator 71 may supply the gaseous refrigerant to the compressor 59 through the bypass line 72 opened by the operation of the bypass valve 73.

In addition, the gas-liquid separator 71 may supply a liquid refrigerant to the heat-exchanger 53.

The third expansion valve 74 is provided in the refrigerant line 51 between the internal condenser 52a and the gas-liquid separator 71.

In addition, the fourth expansion valve 75 may be provided in the refrigerant line 51 between the gas-liquid separator 71 and the heat-exchanger 53.

That is, when the gas injection part 70 is operated in the heating mode of the vehicle, the third expansion valve 74 may expand the refrigerant supplied from the internal condenser 52a to supply it to the gas-liquid separator 71.

In addition, the fourth expansion valve 75 may expand the refrigerant supplied from the gas-liquid separator 71 to flow to the refrigerant line 51.

Conversely, when the gas injection part 70 is not operated in the heating mode of the vehicle, the third expansion valve 74 may pass the refrigerant supplied from the internal condenser 52a.

In addition, the fourth expansion valve 75 may expand the refrigerant passed through the gas-liquid separator 71 to supply it to the heat-exchanger 53.

In addition, in the cooling mode or dehumidifying mode of the vehicle, the third and fourth expansion valves 74 and 75 may not expand the refrigerant supplied from the internal condenser 52a but may flow it.

Here, the heat-exchanger 53 may additionally condense or evaporate the refrigerant discharged from the gas-liquid separator 71 through heat-exchange with the external air according to the selective operation of the fourth expansion valve 75.

When the heat-exchanger 53 condenses the refrigerant, the heat-exchanger 53 further condenses the refrigerant condensed in the internal condenser 52a, so that it may increase sub-cooling of the refrigerant, thus a coefficient of performance (COP), which is a coefficient of cooling capacity to required power of a compressor, may be improved.

Meanwhile, the gas injection part 70 may further include a separate connection line (not shown) that has one end connected to the refrigerant line 51 between the internal condenser 52a and the third expansion valve 74, and the other end connected to the refrigerant line 51 that is connected to the heat-exchanger 53.

A separate on-off valve (not shown) may be provided in the separate connection line (not shown).

That is, in the cooling mode of the vehicle, the connection line (not shown) is opened through the operation of the on-off valve, and in this case, the refrigerant that has passed through the internal condenser 52a may be directly supplied to the heat-exchanger 53 without passing through the gas injection part 70.

Accordingly, cooling performance may be improved by reducing the pressure of the refrigerant circulating along the refrigerant line 51 in the cooling mode of the vehicle.

The air conditioner 50 configured as described above may further include a refrigerant branch line 65 for selectively flowing the refrigerant discharged from the heat-exchanger 53 directly into the accumulator 57, through a refrigerant valve 64 provided in the refrigerant line 51 between the heat-exchanger 53 and the refrigerant connection line 61.

One end of the refrigerant branch line 65 is connected to the refrigerant valve 64. The other end of the refrigerant branch line 65 may be connected to the accumulator 57.

Here, the refrigerant valve 64 may open the refrigerant branch line 65 in the heating mode of the vehicle, and may close the refrigerant line 51 connected to the evaporator 56.

Conversely, the refrigerant valve 64 may close the refrigerant branch line 65 in the cooling mode of the vehicle, and may open the refrigerant line 51 connected to the evaporator 56.

In the present embodiment, the first, second, third, and fourth expansion valves 55, 63, 74, and 75 may be electronic expansion valves that selectively expand the refrigerant while controlling the flow of the refrigerant passing through the refrigerant line 51 or the refrigerant connection line 61.

In addition, the first and second valves V1 and V2, and the refrigerant valve 64, may be 3-way valves that may distribute a flow rate.

Hereinafter, an operation and action of the heat pump system for the vehicle according to the embodiment of the present disclosure configured as described above will be described in detail with reference to FIG. 2 to FIG. 6.

First, an operation of cooling the electrical component 15, the battery module 33, and the autonomous driving controller 35 by using a coolant in the heat pump system for the vehicle according to the embodiment of the present disclosure will be described with reference to FIG. 2.

Figure 2:
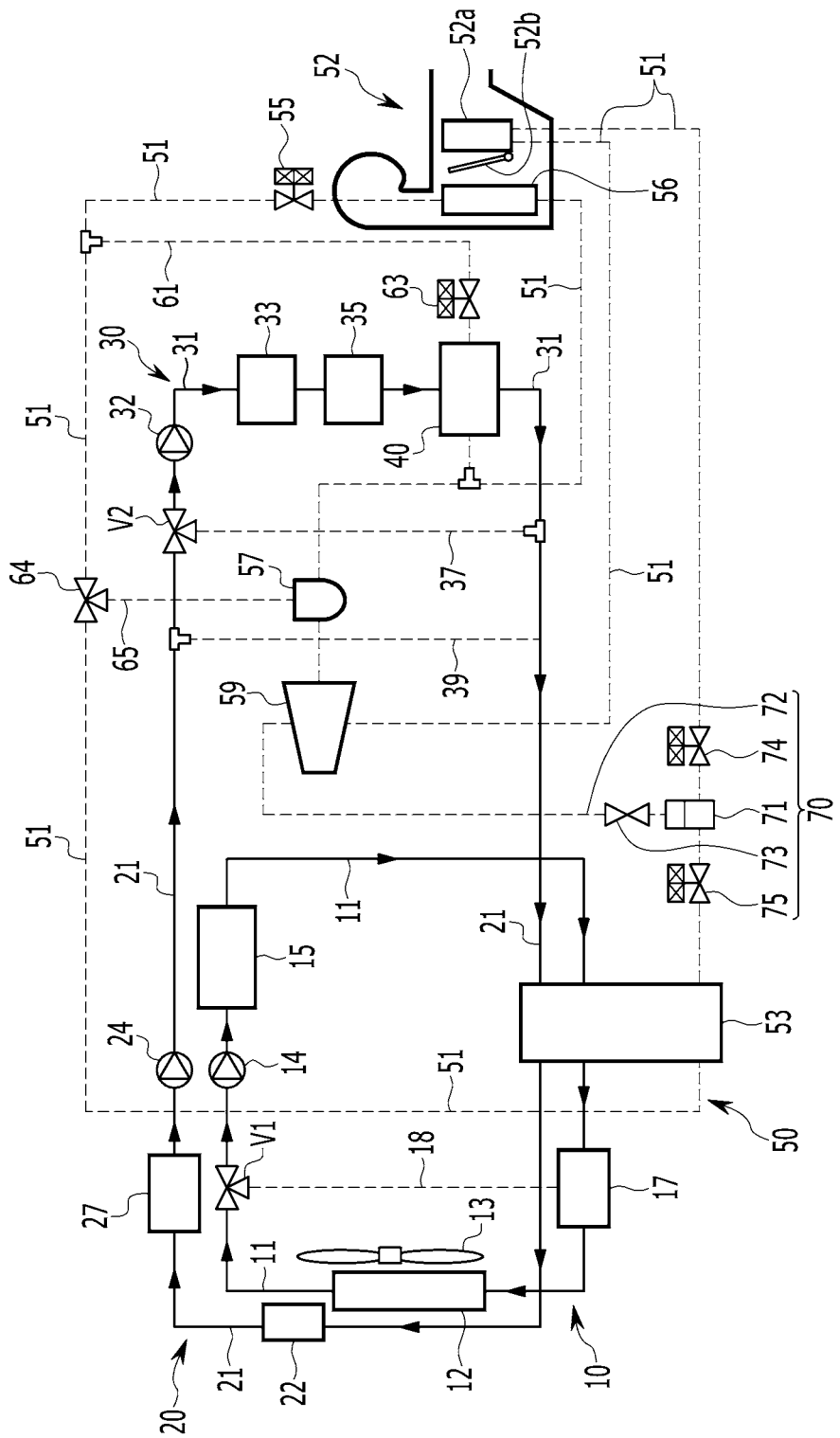
FIG. 2 illustrates an operational state diagram of cooling an electrical component, a battery module, and an autonomous driving controller by using a coolant in a heat pump system for a vehicle according to an embodiment of the present disclosure.

FIG. 2 illustrates an operational state diagram of cooling an electrical component, a battery module, and an autonomous driving controller by using a coolant in a heat pump system for a vehicle according to an embodiment of the present disclosure.

Referring to FIG. 2, the first branch line 18 is closed through the operation of the first valve V1.

The second valve V2 connects the second coolant line 21 and the third coolant line 31, and closes the second branch line 37. In addition, the third branch line 39 is closed.

In this state, in the first cooling apparatus 10, the first water pump 14 operates so as to cool the electrical component 15. Accordingly, the electrical component 15 is supplied with the coolant that is cooled by the first radiator 12 and stored in the first reservoir tank 17.

Therefore, the electrical component 15 may be efficiently cooled.

In the second cooling apparatus 20 and the third cooling apparatus 30, the second and third water pumps 24 and 32 operate for cooling the battery module 33 and the autonomous driving controller 35.

Then, while the coolant cooled by the second radiator 22 and stored in the second reservoir tank 27 is circulated along the second and third coolant lines 21 and 31 by the operation of the second and third water pumps 24 and 32, it is supplied to the battery module 33 and the autonomous driving controller 35.

The coolant that has cooled the battery module 33 and the autonomous driving controller 35 flows back into the second radiator 22 along the third coolant line 31 and the second coolant line 21.

That is, since the low temperature coolant cooled by the second radiator 22 cools only the battery module 33 and the autonomous driving controller 35, the battery module 33 and the autonomous driving controller 35 may be efficiently cooled.

As described above, while the coolant cooled by the first and second radiators 12 and 22 and stored in the first and second reservoir tanks 17 and 27 is circulated in the first coolant line 11, the second coolant line 21, and the third coolant line 31, respectively, through the operation of the first, second, and third water pumps 14, 24, and 32, since it cools the electrical component 15, the battery module 33, and the autonomous driving controller 35, respectively, the electrical component 15, the battery module 33, and the autonomous driving controller 35 may be efficiently cooled.

The air conditioner 50 and the gas injection part 70 do not operate.

Meanwhile, in the present embodiment, the electrical component 15, the battery module 33, and the autonomous driving controller 35 are all cooled with the coolant cooled by the first and second radiators 12 and 22, respectively, but the present disclosure is not limited thereto.

That is, when one of the electrical component 15, the battery module 33, and the autonomous driving controller 35 is separately cooled, the first water pump 14 or the second and third water pumps 24 and 32 may be selectively operated.

An operation of cooling the battery module 33 and the autonomous driving controller 35 in the cooling mode of the vehicle will be described with reference to FIG. 3.

Figure 3:
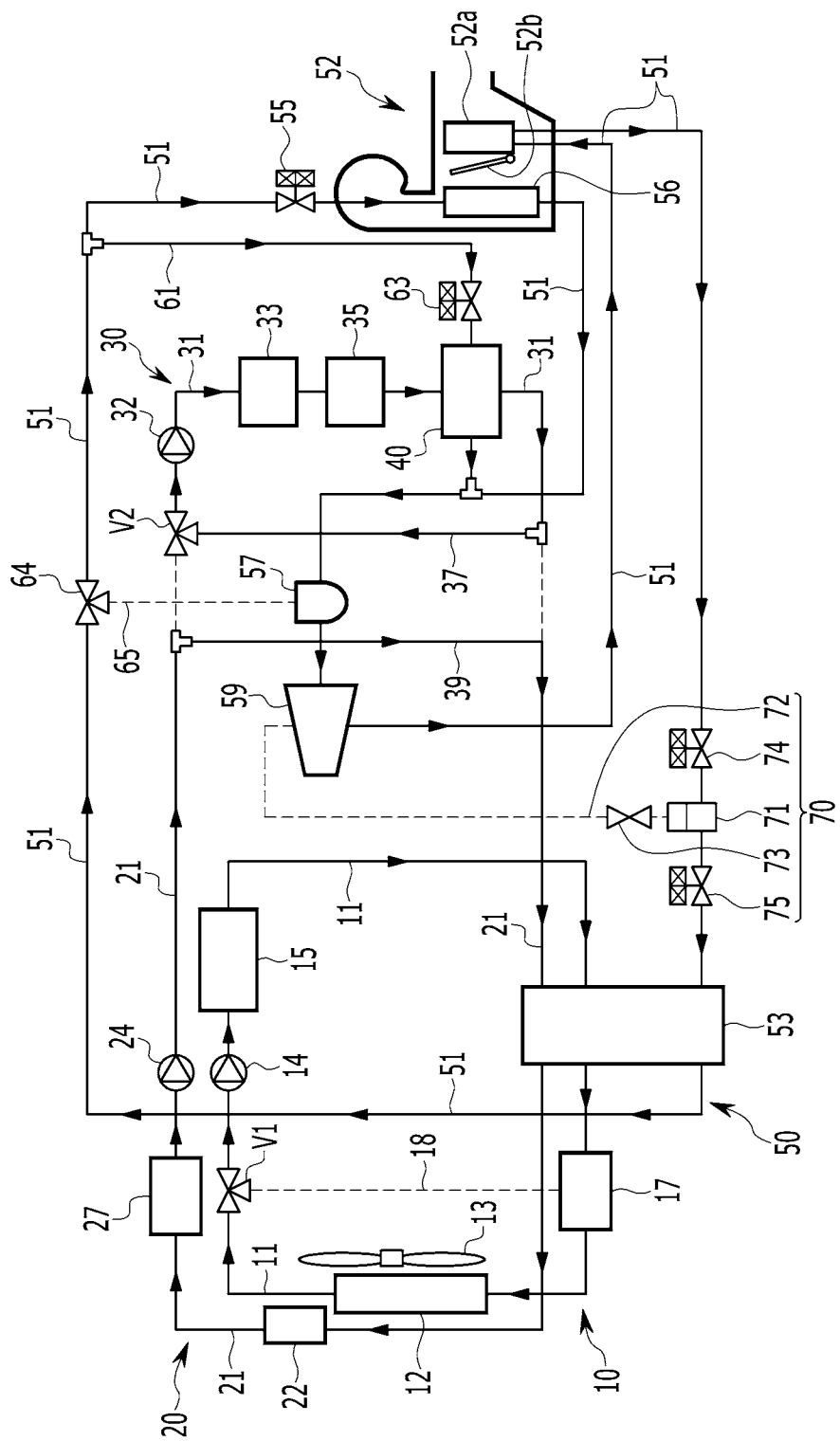
FIG. 3 illustrates an operational state diagram of cooling a battery module and an autonomous driving controller by using a refrigerant in a cooling mode in a heat pump system for a vehicle according to an embodiment of the present disclosure.

FIG. 3 illustrates an operational state diagram of cooling a battery module and an autonomous driving controller by using a refrigerant in a cooling mode in a heat pump system for a vehicle according to an embodiment of the present disclosure.

Referring to FIG. 3, in the first cooling apparatus 10, the first water pump 14 is operated to cool the electrical component 15 and the heat-exchanger 53. Accordingly, the coolant cooled by the first radiator 12 is circulated in the electrical component 15 and the heat-exchanger 53.

Here, the first branch line 18 is closed through the operation of the first valve V1.

That is, in the first cooling apparatus 10, the coolant cooled by the first radiator 12 may be supplied to the electrical component 15 and the heat-exchanger 53 through the operation of the first water pump 14.

In the second cooling apparatus 20, the second water pump 24 is operated to supply the coolant to the heat-exchanger 53.

Meanwhile, the second branch line 37 is opened through the operation of the second valve V2. In addition, the third branch line 39 is opened.

Accordingly, the second coolant line 21 is connected to the third coolant line 31 through the opened second and third branch lines 37 and 39 and the operation of the second valve V2.

That is, in the second cooling apparatus 20, the opened third branch line 39 may be connected to the second coolant line 21 to form a closed circuit in which the coolant is independently circulated.

Accordingly, in the second cooling apparatus 20, the coolant is circulated in the opened third branch line 39 and the opened second coolant line 31 through the operation of the second water pump 24.

In addition, the third cooling apparatus 30 may form a closed circuit in which the coolant is independently circulated through the opened second branch line 37.

Accordingly, the coolant cooled by the second radiator 22 circulates in the second coolant line 21 and the second branch line 37 in order to cool the heat-exchanger 53 through the operation of the second water pump 24.

That is, the coolant cooled by the second radiator 22 may be supplied to the heat-exchanger 53 through the operation of the second water pump 24.

In addition, in the third cooling apparatus 30, the coolant passing through the chiller 40 is supplied to the battery module 33 and the autonomous driving controller 35 along the opened second branch line 37 and the third coolant line 31 through the operation of the third water pump 32.

In addition, in the third cooling apparatus 30, the coolant that has passed the chiller 40 through the operation of the third water pump 32 is supplied to the battery module 33 and the autonomous driving controller 35.

That is, the coolant that has passed the chiller 40 may be supplied to the battery module 33 and the autonomous driving controller 35 without passing through the second radiator 22 while circulating along the third coolant line 31 and the second branch line 37.

In the air conditioner 50, each constituent element thereof operates to cool the interior of the vehicle. Accordingly, the refrigerant is circulated along the refrigerant line 51.

Here, the refrigerant line 51 connecting the heat-exchanger 53 and the evaporator 56 is opened through the operation of the first expansion valve 55. The refrigerant connection line 61 is opened through the operation of the second expansion valve 63.

Then, the refrigerant that has passed through the heat-exchanger 53 may be circulated along the refrigerant line 51 and the refrigerant connection line 61.

Here, the first and second expansion valves 55 and 63 may expand the refrigerant so that the expanded refrigerant may be supplied to the evaporator 56 and the chiller 40, respectively.

In addition, the heat-exchanger 53 condenses the refrigerant by using the coolant flowing along the first and second coolant lines 11 and 21.

Meanwhile, the coolant passing through the chiller 40 circulates in the third coolant line 31 and the second branch line 37 without passing through the second radiator 22 to cool the battery module 33 and the autonomous driving controller 35 through the operation of the third water pump 32.

The coolant passing through the chiller 40 is cooled through heat-exchange with the expanded refrigerant supplied to the chiller 40. The coolant cooled in the chiller 40 is supplied to the battery module 33 and the autonomous driving controller 35. Accordingly, the battery module 33 and the autonomous driving controller 35 are cooled by the cooled coolant.

That is, the second expansion valve 63 expands some of the refrigerant that has passed through the heat-exchanger 53 to supply the expanded refrigerant to the chiller 40, and opens the refrigerant connection line 61.

Therefore, some of the refrigerant discharged from the heat-exchanger 53 is expanded through the operation of the second expansion valve 63 to enter a low temperature and low pressure state, and flows into the chiller 40 connected to the refrigerant connection line 61.

Then, the refrigerant flowing into the chiller 40 is heat-exchanged with the coolant, passes through the accumulator 57 through the refrigerant connection line 61, and then flows into the compressor 59.

The coolant whose temperature rises while cooling the battery module 33 and the autonomous driving controller 35 is cooled through heat-exchange with a low temperature and low pressure refrigerant in the chiller 40. The cooled coolant is supplied back to the battery module 33 and the autonomous driving controller 35 through the third coolant line 31 and the second branch line 37.

That is, the coolant may efficiently cool the battery module 33 and the autonomous driving controller 35 while repeatedly performing the above-described operation.

Meanwhile, the remaining refrigerant discharged from the heat-exchanger 53 flows through the refrigerant line 51 to cool the interior of the vehicle, and sequentially passes through the first expansion valve 55, the evaporator 56, and the compressor 59.

Here, the external air flowing into the HVAC module 52 is cooled while passing through the evaporator 56 by the low-temperature refrigerant flowing into the evaporator 56.

In this case, a part of the opening/closing door 52b passing through the internal condenser 52a is closed so that the cooled outside air does not pass through the internal condenser 52a. Accordingly, the cooled outside air directly flows into the interior of the vehicle, thereby cooling the vehicle interior.

Meanwhile, the refrigerant with an increased condensation amount while sequentially passing through the internal condenser 52a and the heat-exchanger 53 is expanded and supplied to the evaporator 56, so that the refrigerant may be evaporated at a lower temperature.

That is, in the present embodiment, the internal condenser 52a condenses the refrigerant, and the heat-exchanger 53 additionally condenses the refrigerant, thereby advantageously sub-cooling the refrigerant.

In addition, as the refrigerant in which the sub-cooling is performed is evaporated at a lower temperature in the evaporator 56, the temperature of the outside air passing through the evaporator 56 may be further lowered, thereby improving cooling performance and efficiency.

Meanwhile, the operation of the gas injection part 70 stops. Here, the refrigerant discharged from the internal condenser 52a may be supplied to the heat-exchanger without expansion in the third and fourth expansion valves 74 and 75.

While repeating the above-described process, the refrigerant may cool the interior in the cooling mode of the vehicle, and at the same time, it may cool the coolant through heat-exchange while passing through the chiller 40.

The low temperature coolant cooled in the chiller 40 flows into the battery module 33 and the autonomous driving controller 35. Accordingly, the battery module 33 and the autonomous driving controller 35 may be efficiently cooled by the supplied low temperature coolant.

In the present embodiment, an operation of recovering the external heat and waste heat from the electrical component 15 in the heating mode of the vehicle will be described with reference to FIG. 4.

Figure 4:
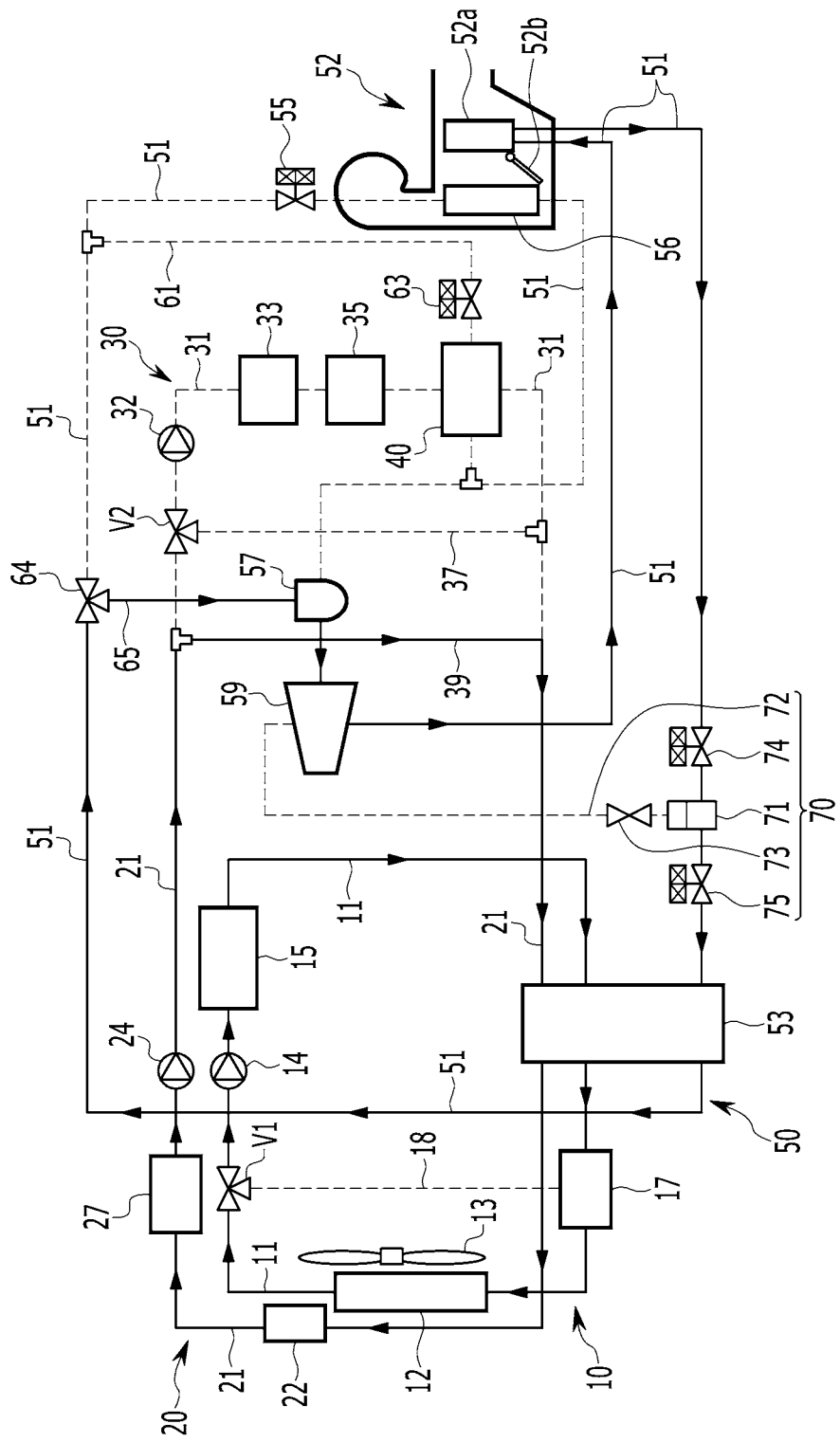
FIG. 4 illustrates an operational state diagram of an external heat source and waste heat recovery from an electrical component according to a heating mode in a heat pump system for a vehicle according to an embodiment of the present disclosure.

FIG. 4 illustrates an operational state diagram of external heat and waste heat recovery from an electrical component according to a heating mode in a heat pump system for a vehicle according to an embodiment of the present disclosure.

Referring to FIG. 4, the heat pump system may absorb the external heat from the external air together with the waste heat of the electrical component 15.

First, in the cooling apparatus 10, the first water pump 14 is operated to circulate the coolant.

Here, the first branch line 18 may be selectively opened or closed through the operation of the first valve V1.

That is, when an amount of heat generated in the electrical component 15 is small, the first valve V1 opens the first branch line 18 and closes the first coolant line 11 connecting the electrical component 15 and the first radiator 12.

Accordingly, the coolant that has passed through the electrical component 15 is continuously circulated along the first coolant line 11 without passing through the first radiator 12, and recovers waste heat from the electrical component 15, thus the temperature of the coolant rises.

The coolant whose temperature has risen is supplied to the heat-exchanger 53. In this case, the heat-exchanger 53 may recover the waste heat of the electrical component 15 from the coolant whose temperature has risen.

Conversely, when the electrical component 15 overheats, the first valve V1 closes the first branch line 18 and opens the first coolant line 11 connecting the electrical component 15 and the first radiator 12.

Accordingly, the coolant passing through the electrical component 15 is circulated along the first coolant line 11 and cooled in the first radiator 12. The coolant cooled by the first radiator 12 cools the overheated electrical component 15, thereby preventing the electrical component 15 from further overheating.

Meanwhile, in the second cooling apparatus 20, the second water pump 24 is operated to supply the coolant to the heat-exchanger 53.

Here, the second branch line 37 is closed through the operation of the second valve V2. At the same time, the third branch line 39 is opened.

Therefore, the second coolant line 21 is not connected to the third coolant line 31 through the closed second branch line 37 and the opened third branch line 39.

That is, in the second cooling apparatus 20, the opened third branch line 39 may be connected to the second coolant line 21, and a closed circuit in which the coolant is circulated independently from the third cooling apparatus 30 may be formed.

Meanwhile, in the third cooling apparatus 30, the coolant is not circulated by the third water pump 32 of which operation is stopped.

Accordingly, the coolant that has passed through the second radiator 22 may be circulated along the second coolant line 21 and the third branch line 39 through the operation of the second water pump 24.

Here, the coolant passing through the second coolant line 21 absorbs the external heat while passing through the second radiator 22, and the temperature of the coolant rises. The coolant whose temperature has risen is supplied to the heat-exchanger 53.

That is, the coolant whose temperature has risen in the first and second cooling apparatuses 10 and 20 is recovered while passing through the heat-exchanger 53 through the operation of the first and second water pumps 14 and 24, and while being heat-exchanged with the refrigerant discharged from the heat-exchanger 53.

Meanwhile, in the air conditioner 50, each constituent element thereof operates to heat the interior of the vehicle. Accordingly, the refrigerant is circulated along the refrigerant line 51.

Here, the refrigerant line 51 connecting the heat-exchanger 53 and the evaporator 56 is closed through the operation of the first expansion valve 55. The refrigerant connection line 61 is closed through the operation of the second expansion valve 63.

That is, the refrigerant line 51 connecting the heat-exchanger 53 and the evaporator 56, and the refrigerant connection line 61 connected to the chiller 40, are closed through the operation of the first and second expansion valves 55 and 63.

In addition, the refrigerant branch line 65 may be opened through the operation of the refrigerant valve 64.

Here, the fourth expansion valve 75 of the gas injection part 70 may expand the refrigerant supplied from the internal condenser 52a to supply the refrigerant to the heat-exchanger 53.

Accordingly, the heat-exchanger 53 may recover the waste heat of the electrical component 15 while evaporating the refrigerant expanded while passing through the fourth expansion valve 75 through heat-exchange with the coolant with a temperature that is increased while cooling the electrical component 15.

The refrigerant that has passed through the heat-exchanger 53 is supplied to the accumulator 57 along the refrigerant branch line 65 opened by the operation of the refrigerant valve 64.

The refrigerant supplied to the accumulator 57 is separated into gas and liquid. The gaseous refrigerant of the refrigerant separated into gas and liquid is supplied to the compressor 59.

The refrigerant compressed at a high temperature and high pressure in the compressor 59 flows into the internal condenser 52*a*.

Here, the refrigerant supplied to the internal condenser 52*a* may increase the temperature of the external air flowing into the HVAC module 52.

The opening/closing door 52*b* is opened so that the external air that flows into the HVAC module 52 and then passes through the evaporator 56 passes through the internal condenser 52*a*.

Accordingly, the external air flowing from the outside flows in an uncooled state when passing through the evaporator 56 to which no refrigerant is supplied. The flowed external air is converted to a high temperature state while passing through the internal condenser 52*a* to flow into the vehicle interior, so that the vehicle interior may be heated.

In the present embodiment, a case of operating the gas injection part 70 while recovering the external heat source and the waste heat from the electrical component 15 in the heating mode of the vehicle will be described with reference to FIG. 5.

Figure 5:
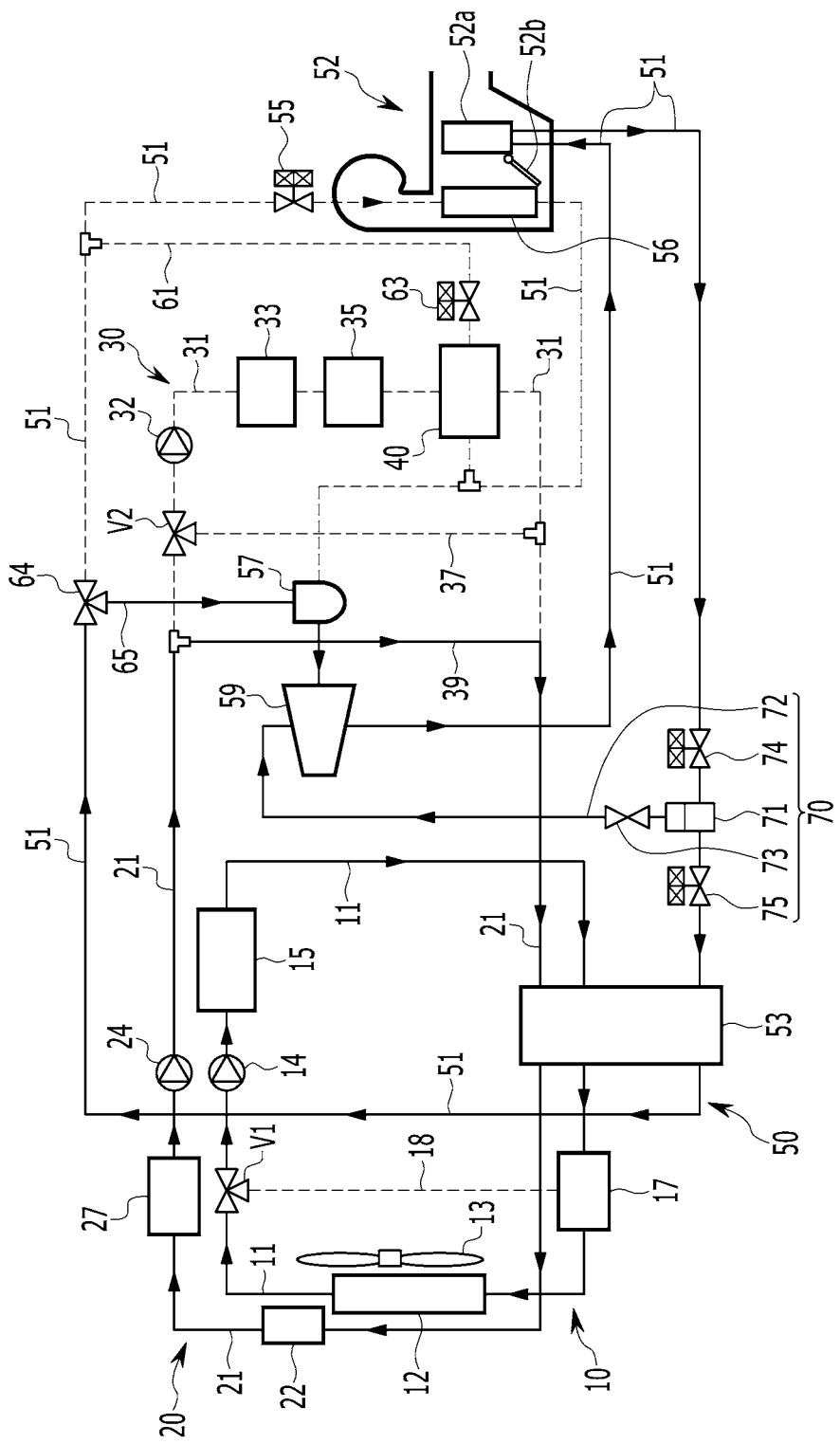
FIG. 5 illustrates an operational state diagram of an external heat source, waste heat recovery from an electrical component, and an operation of a gas injection part according to a heating mode in a heat pump system for a vehicle according to an embodiment of the present disclosure.

FIG. 5 illustrates an operational state diagram of an external heat source, waste heat recovery from an electrical component, and an operation of a gas injection part according to a heating mode in a heat pump system for a vehicle according to an embodiment of the present disclosure.

Referring to FIG. 5, the heat pump system may absorb the external heat from the external air together with the waste heat of the electrical component 15.

First, in the cooling apparatus 10, the first water pump 14 is operated to circulate the coolant.

Here, the first branch line 18 may be selectively opened or closed through the operation of the first valve V1.

That is, when an amount of heat generated in the electrical component 15 is small, the first valve V1 opens the first branch line 18 and closes the first coolant line 11 connecting the electrical component 15 and the first radiator 12.

Accordingly, the coolant that has passed through the electrical component 15 is continuously circulated along the first coolant line 11 without passing through the first radiator 12, and recovers the waste heat from the electrical component 15, thus the temperature of the coolant rises.

The coolant whose temperature has risen is supplied to the heat-exchanger 53. In this case, the heat-exchanger 53 may recover the waste heat of the electrical component 15 from the coolant whose temperature has risen.

Conversely, when the electrical component 15 overheats, the first valve V1 closes the first branch line 18 and opens the first coolant line 11 connecting the electrical component 15 and the first radiator 12.

Accordingly, the coolant passing through the electrical component 15 is circulated along the first coolant line 11 and cooled in the first radiator 12. The coolant cooled by the first radiator 12 cools the overheated electrical component 15, thereby preventing the electrical component 15 from further overheating.

Meanwhile, in the second cooling apparatus 20, the second water pump 24 is operated to supply the coolant to the heat-exchanger 53.

Here, the second branch line 37 is closed through the operation of the second valve V2. At the same time, the third branch line 39 is opened.

Therefore, the second coolant line 21 is not connected to the third coolant line 31 through the closed the second branch line 37 and the opened the third branch line 39.

That is, in the second cooling apparatus 20, the opened third branch line 39 may be connected to the second coolant line 21, and a closed circuit in which the coolant is circulated independently from the third cooling apparatus 30 may be formed.

Meanwhile, in the third cooling apparatus 30, the coolant is not circulated by the third water pump 32 of which operation is stopped.

Accordingly, the coolant that has passed through the second radiator 22 may be circulated along the second coolant line 21 and the third branch line 39 through the operation of the second water pump 24.

Here, the coolant passing through the second coolant line 21 absorbs the external heat source while passing through the second radiator 22, and the temperature of the coolant rises. The coolant whose temperature has risen is supplied to the heat-exchanger 53.

That is, the coolant whose temperature has risen in the first and second cooling apparatuses 10 and 20 is recovered while passing through the heat-exchanger 53 through the operation of the first and second water pumps 14 and 24, and while being heat-exchanged with the refrigerant discharged from the heat-exchanger 53.

Meanwhile, in the air conditioner 50, each constituent element thereof operates to heat the interior of the vehicle. Accordingly, the refrigerant is circulated along the refrigerant line 51.

Here, the refrigerant line 51 connecting the heat-exchanger 53 and the evaporator 56 is closed through the operation of the first expansion valve 55. The refrigerant connection line 61 is closed through the operation of the second expansion valve 63.

That is, the refrigerant line 51 connecting the heat-exchanger 53 and the evaporator 56, and the refrigerant connection line 61 connected to the chiller 40, are closed through the operation of the first and second expansion valves 55 and 63.

In addition, the refrigerant branch line 65 may be opened through the operation of the refrigerant valve 64.

Here, the fourth expansion valve 75 of the gas injection part 70 may expand the refrigerant supplied from the internal condenser 52*a* to supply it to the heat-exchanger 53.

Accordingly, the heat-exchanger 53 may recover the waste heat of the electrical component 15 while evaporating the refrigerant expanded while passing through the fourth expansion valve 75 through heat-exchange with the coolant with a temperature that is increased while cooling the electrical component 15.

The refrigerant that has passed through the heat-exchanger 53 is supplied to the accumulator 57 along the refrigerant branch line 65 opened by the operation of the refrigerant valve 64.

The refrigerant supplied to the accumulator 57 is separated into gas and liquid. The gaseous refrigerant of the refrigerant separated into gas and liquid is supplied to the compressor 59.

The refrigerant compressed at a high temperature and high pressure in the compressor 59 flows into the internal condenser 52*a*.

Here, the refrigerant supplied to the internal condenser 52*a* may increase the temperature of the external air flowing into the HVAC module 52.

The opening/closing door 52b is opened so that the external air that flows into the HVAC module 52 and then passes through the evaporator 56 passes through the internal condenser 52a.

Accordingly, the external air flowing from the outside flows in an uncooled state when passing through the evaporator 56 to which no refrigerant is supplied. The flowed external air is converted to a high temperature state while passing through the internal condenser 52a to flow into the vehicle interior, so that the vehicle interior may be heated.

Here, when the gas injection part 70 is operated, the bypass line 72 is opened through the operation of the bypass valve 73.

In this state, the third expansion valve 74 expands the refrigerant supplied from the internal condenser 52a to supply it to the gas-liquid separator 71.

Among the refrigerant supplied to the gas-liquid separator 71, the gaseous refrigerant is supplied to the compressor 59 through the opened bypass line 72.

That is, the gas injection part 70 flows the gaseous refrigerant heat-exchanged while passing through the gas-liquid separator 71 back into the compressor 59 through the bypass line 72, thereby increasing the flow rate of the refrigerant circulating in the refrigerant line 51.

In addition, the liquid refrigerant discharged from the gas-liquid separator 71 through the refrigerant line 51 flows into the heat-exchanger 53 along the refrigerant line 51 opened through the operation of the fourth expansion valve 75.

In this case, the fourth expansion valve 75 may expand the refrigerant supplied from the gas-liquid separator 17.

That is, the gas-liquid separator 71 of the gas injection part 70 may bypass the gaseous refrigerant to the compressor 59 through the bypass line 72, and may supply the liquid refrigerant to the fourth expansion valve 75.

Then, the refrigerant may be expanded while passing through the fourth expansion valve 75, and may be evaporated through heat-exchange with the coolant in the heat-exchanger 53.

In addition, the refrigerant may smoothly recover the waste heat from the coolant whose temperature has risen while passing through the electrical component 15 from the heat-exchanger 53, thereby improving heating performance and efficiency.

That is, the heat pump system according to the present embodiment absorbs the external heat in the second cooling apparatus 20 when heating is required in an initial starting idle state (IDLE) state or in an initial running state of the vehicle, and it increases the temperature of the refrigerant by using the waste heat of the electrical component 15, so that the power consumption of the compressor 59 may be reduced, and the heating efficiency may be improved.

In addition, the present disclosure may improve heating efficiency and performance while minimizing a use amount of a separate electric heater.

Furthermore, the gas injection part 70 may maximize the heating performance by increasing the flow rate of the refrigerant circulating in the refrigerant line 51.

Meanwhile, in the present embodiment, the case of recovering the waste heat of the electrical component 15 together is described, but the present disclosure is not limited thereto, and the waste heat of the battery module 33 and the autonomous driving controller 35 may be selectively recovered.

That is, in the case of recovering the waste heat from the battery module 33 and the autonomous driving controller 35, the third cooling apparatus 30 may be operated, and the refrigerant connection line 61 may be opened through the operation of the second expansion valve 63 so that the refrigerant is supplied to the chiller 40.

In the present embodiment, an operation for a dehumidifying mode of a vehicle will be described with reference to FIG. 6.

Figure 6:
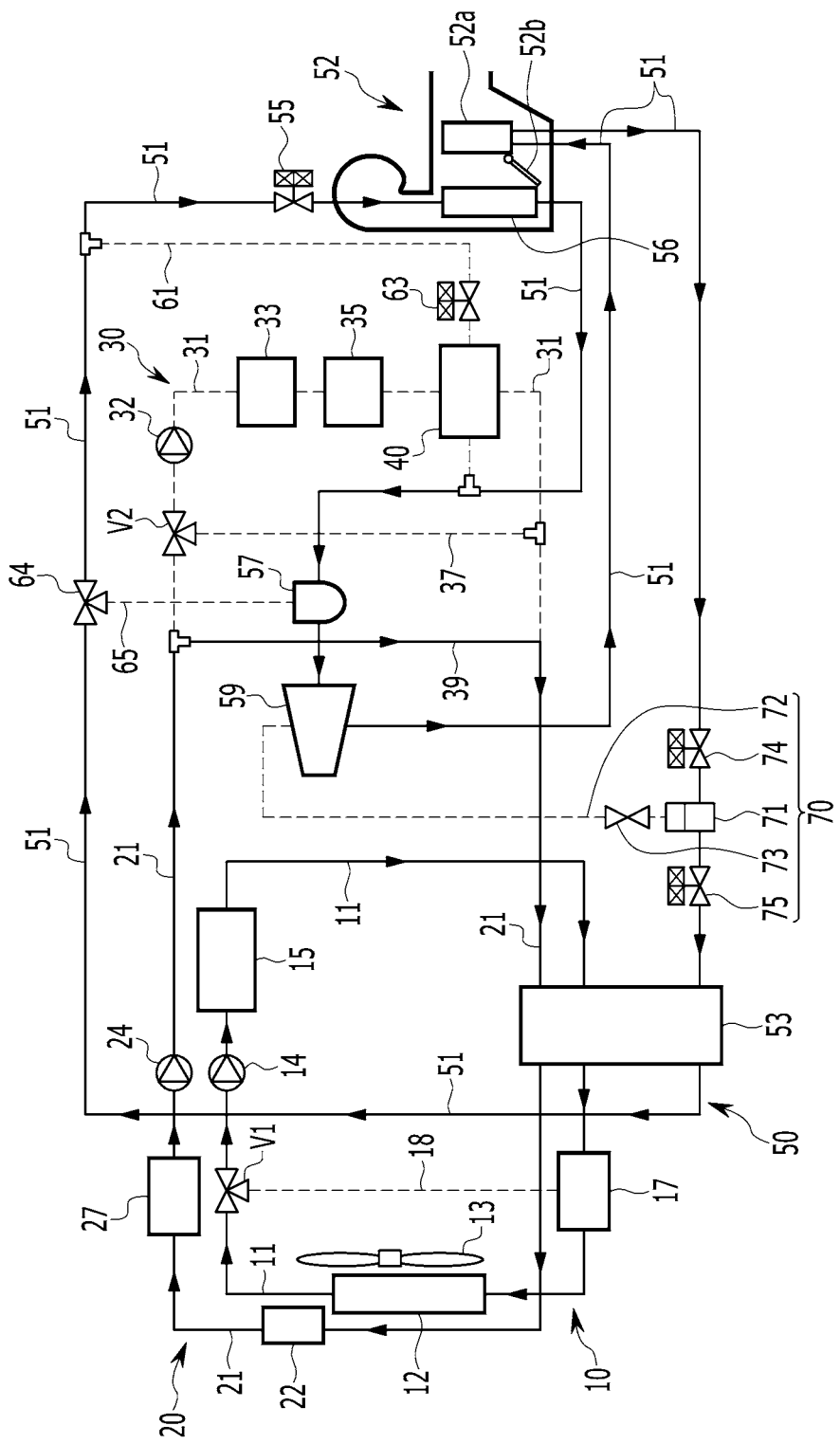
FIG. 6 illustrates an operational state diagram of a dehumidifying mode in a heat pump system for a vehicle according to an embodiment of the present disclosure.

FIG. 6 illustrates an operational state diagram of a dehumidifying mode in a heat pump system for a vehicle according to an embodiment of the present disclosure.

Referring to FIG. 6, the heat pump system may perform the dehumidifying mode while heating the vehicle interior.

First, in the cooling apparatus 10, the first water pump 14 is operated to circulate the coolant.

Here, the first branch line 18 may be closed through the operation of the first valve V1.

Accordingly, the coolant passing through the electrical component 15 is circulated along the first coolant line 11 and cooled in the first radiator 12.

The coolant cooled by the first radiator 12 cools the electrical component 15. At the same time, the coolant may recover the waste heat from the electrical component 15 while cooling the electrical component 15.

Meanwhile, in the second cooling apparatus 20, the second water pump 24 is operated to supply the coolant to the heat-exchanger 53.

Here, the second branch line 37 is closed through the operation of the second valve V2. At the same time, the third branch line 39 is opened.

Therefore, the second coolant line 21 is not connected to the third coolant line 31 through the closed second branch line 37 and the opened third branch line 39.

That is, in the second cooling apparatus 20, the opened third branch line 39 may be connected to the second coolant line 21, and a closed circuit in which the coolant is circulated independently from the third cooling apparatus 30 may be formed.

Meanwhile, in the third cooling apparatus 30, the coolant is not circulated by the third water pump 32 of which operation is stopped.

Accordingly, the coolant that has passed through the second radiator 22 may be circulated along the second coolant line 21 and the third branch line 39 through the operation of the second water pump 24.

Here, the coolant passing through the second coolant line 21 absorbs the external heat while passing through the second radiator 22, and the temperature of the coolant rises. The coolant whose temperature has risen is supplied to the heat-exchanger 53.

That is, the coolant whose temperature has risen in the first and second cooling apparatuses 10 and 20 is recovered while passing through the heat-exchanger 53 through the operation of the first and second water pumps 14 and 24, and while being heat-exchanged with the refrigerant discharged from the heat-exchanger 53.

Meanwhile, in the air conditioner 50, each constituent element thereof operates to heat and dehumidify the interior of the vehicle. Accordingly, the refrigerant is circulated along the refrigerant line 51.

In this case, the operation of the gas injection part 70 may stop.

The refrigerant line 51 connecting the heat-exchanger 53 and the evaporator 56 is opened through the operation of the first expansion valve 55.

The refrigerant connection line 61 is closed through the operation of the second expansion valve 63.

Here, the first expansion valve 55 may expand the refrigerant supplied to the refrigerant line 51 so that the expanded refrigerant may be supplied to the evaporator 56.

In addition, the third and fourth expansion valves 74 and 75 may not expand the refrigerant supplied from the internal condenser 52a but may flow it.

In the present embodiment, the refrigerant valve 64 may close the refrigerant branch line 65 so that the refrigerant supplied from the heat-exchanger 53 may be supplied to the evaporator 56.

Accordingly, the coolant passing through the heat-exchanger 53 may flow into the evaporator 56 along the refrigerant line 51 opened through the operation of the first expansion valve 55 and the refrigerant valve 64.

The expanded refrigerant supplied to the evaporator 56 through the operation of the first expansion valve 55 is heat-exchanged with the external air passing through the evaporator 56, and then is supplied to the compressor 59 through the accumulator 57 along the refrigerant line 51.

In addition, the refrigerant compressed at a high temperature and high pressure in the compressor 59 flows into the internal condenser 52a.

Here, the opening/closing door 52b is opened so that the external air that flows into the HVAC module 52 and then passes through the evaporator 56 passes through the internal condenser 52a.

That is, the external air flowing into the HVAC module 52 is dehumidified while passing through the evaporator 56 by the low-temperature refrigerant flowing into the evaporator 56. Then, while passing through the internal condenser 52a, it is converted into a high temperature state to flow into the interior of the vehicle, thereby heating and dehumidifying the interior of the vehicle.

Therefore, as described above, according to the heat pump system for the vehicle according to the embodiment of the present disclosure, by controlling the temperature of the battery module 33 and the autonomous driving controller 35 according to the mode of the vehicle by using one chiller 40 in which the coolant and the refrigerant are heat-exchanged, the entire system may be simplified.

In addition, according to the present disclosure, the battery module 33 may operate in an optimum performance state by efficiently controlling the temperature of the battery module 33, and the total traveling distance of the vehicle may be increased through the efficient management of the battery module 33.

In addition, the present disclosure may improve the heating efficiency by selectively using the external heat source or the waste heat from the electrical component 15 in the heating mode of the vehicle.

In addition, the present disclosure may maximize the heating performance by selectively increasing the flow rate of the refrigerant in the heating mode by applying the gas injection part 70.

Furthermore, the present disclosure may reduce the manufacturing cost and weight through simplification of the entire system, and may improve space utilization.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A heat pump system for a vehicle, comprising:
    a first cooling apparatus including a first radiator, a first water pump, and a first valve that are connected by a first coolant line, wherein the first cooling apparatus is configured to circulate a first coolant in the first coolant line to cool at least one electrical component provided in the first coolant line;
    a second cooling apparatus including a second radiator and a second water pump connected by a second coolant line, wherein the second cooling apparatus is configured to circulate a second coolant in the second coolant line;
    a third cooling apparatus including a third coolant line selectively connected through the second coolant line and a second valve, and a third water pump, a battery module, and an autonomous driving controller provided in the third coolant line, wherein the third cooling apparatus is configured to circulate the second coolant in the battery module and the autonomous driving controller;
    a chiller provided in the third coolant line so that the second coolant passes therethrough, wherein the chiller is connected through a refrigerant line and a refrigerant connection line of an air conditioner, and wherein the chiller is configured to heat-exchange the second coolant flowing through the third coolant line with a refrigerant supplied from the air conditioner to control a temperature of the second coolant; and
    a gas injection part provided in the air conditioner and increasing a flow rate of the refrigerant circulating in the refrigerant line by bypassing some of the refrigerant passing through an internal condenser to a compressor;
    wherein a heat-exchanger included in the air conditioner is connected to each of the first and second coolant lines so that the first and second coolants circulating in the first and second cooling apparatuses passes therethrough.

2. The heat pump system for the vehicle of claim 1, wherein the air conditioner includes:
    an HVAC module including an evaporator connected thereto through the refrigerant line, and a door that controls a flow of an external air passing through the evaporator into the internal condenser according to cooling, heating, and dehumidifying modes of the vehicle;
    a compressor connected between the evaporator and the internal condenser through the refrigerant line;
    a first expansion valve provided in the refrigerant line connecting the heat-exchanger and the evaporator;
    a second expansion valve provided in the refrigerant connection line; and
    an accumulator provided in the refrigerant line between the evaporator and the compressor and connected to the refrigerant connection line.

3. The heat pump system for the vehicle of claim 2, wherein the second expansion valve, when cooling the battery module by using a coolant heat-exchanged with the refrigerant, expands the refrigerant flowing through the refrigerant connection line to flow into the chiller.

4. The heat pump system for the vehicle of claim 2, wherein the gas injection part includes:
    a gas-liquid separator provided in the refrigerant line between the internal condenser and the heat exchanger, wherein the gas-liquid separator is configured to discharge a gaseous refrigerant and a liquid refrigerant among the refrigerant that have passed through the internal condenser;
a bypass line connecting the gas-liquid separator and the compressor, the bypass line configured to supply the gaseous refrigerant from the gas-liquid separator to the compressor;
a bypass valve provided in the bypass line;
a third expansion valve provided in the refrigerant line between the internal condenser and the gas-liquid separator; and
a fourth expansion valve provided in the refrigerant line between the gas-liquid separator and the heat-exchanger.

5. The heat pump system for the vehicle of claim 4, wherein when the gas injection part is operated in a heating mode of vehicle,
the third expansion valve expands a refrigerant supplied from the internal condenser to supply the refrigerant to the gas-liquid separator; and
the fourth expansion valve expands a refrigerant supplied from the gas-liquid separator to flow to the refrigerant line.

6. The heat pump system for the vehicle of claim 4, wherein when the gas injection part is not operated in a heating mode of vehicle,
the third expansion valve passes a refrigerant supplied from the internal condenser; and
the fourth expansion valve expands a refrigerant that has passed through the gas-liquid separator to supply it to the heat-exchanger.

7. The heat pump system for the vehicle of claim 4, wherein in a cooling or dehumidifying mode of the vehicle, the third and fourth expansion valves do not expand the refrigerant supplied from the internal condenser but flow the refrigerant through the refrigerant line.

8. The heat pump system for the vehicle of claim 4, wherein the bypass valve, when the gas injection part is operated, operates so that the bypass line is opened.

9. The heat pump system for the vehicle of claim 4, wherein the first, second, third, and fourth expansion valves are electronic expansion valves that expand the refrigerant while controlling flowing of the refrigerant.

10. The heat pump system for the vehicle of claim 4, wherein the heat-exchanger condenses or evaporates the refrigerant condensed in the internal condenser through heat-exchange with external air, according to a selective operation of the fourth expansion valve.

11. The heat pump system for the vehicle of claim 4, wherein the air conditioner further includes a refrigerant branch line that selectively flows the refrigerant discharged from the heat-exchanger directly into the accumulator by a refrigerant valve provided in the refrigerant line between the heat-exchanger and the refrigerant connection line.

12. The heat pump system for the vehicle of claim 11, wherein the refrigerant valve opens the refrigerant branch line in a heating mode of the vehicle.

13. The heat pump system for the vehicle of claim 11, wherein the first cooling apparatus is provided with a first branch line that is connected to the first coolant line between the first radiator and the first water pump through the first valve provided in the first coolant line between the first radiator and the first water pump;
the third cooling apparatus is provided with a second branch line that is connected to the third coolant line through the second valve so as to form a closed circuit independent from the second cooling apparatus; and
the second cooling apparatus is provided with a third branch line that separates the second coolant line and the third coolant line.

14. The heat pump system for the vehicle of claim 13, wherein when cooling the battery module and the autonomous driving controller in a cooling mode of the vehicle,
in the first cooling apparatus, the first branch line is closed by the first valve, and the first coolant cooled by the first radiator is circulated in the electrical component by the first water pump;
the second branch line is opened by the second valve, and the third branch line is opened; and
the second coolant line and the third coolant line are disconnected by the opened second and third branch lines; and
in the second cooling apparatus, the second coolant is circulated in the third branch line and the second coolant line that are opened by the second water pump; and
in the third cooling apparatus, the second coolant that has passed through the chiller by the third water pump is supplied to the battery module and the autonomous driving controller, while
in the air conditioner, the refrigerant is circulated along the refrigerant line and the refrigerant connection line in a state in which the refrigerant connection line is opened by the second expansion valve,
the first and second expansion valves expand the refrigerant so that the expanded refrigerant is supplied to the evaporator and the chiller, respectively, and
the refrigerant branch line is closed by the refrigerant valve.

15. The heat pump system for the vehicle of claim 14, wherein in the first cooling apparatus, the first coolant cooled by the first radiator is supplied to the heat-exchanger by the first water pump;
in the second cooling apparatus, the opened third branch line is connected to the second coolant line to form a closed circuit independent from the third cooling apparatus, and the second coolant cooled by the second radiator is supplied to the heat-exchanger through an operation of the second water pump; and
the heat-exchanger condenses a refrigerant through heat-exchange with each coolant.

16. The heat pump system for the vehicle of claim 13, wherein when recovering external heat and waste heat from the electrical component in a heating mode of the vehicle,
the first branch line is opened or closed through operation of the first valve;
in the first cooling apparatus, the first coolant is circulated in the electrical component by the first water pump;
in a state in which the second coolant line and the third coolant line are disconnected by the second valve, the second branch line is closed and the third branch line is opened;
in the second cooling apparatus, the second coolant is circulated in the second coolant line and the opened third branch line through an operation of the second water pump;
the third cooling apparatus stops operation;
in the air conditioner, a refrigerant line connecting the heat-exchanger and the evaporator is closed by the first expansion valve;
the refrigerant connection line is closed by the second expansion valve;
the refrigerant branch line is opened by the refrigerant valve; and the heat-exchanger heat-exchanges a refrigerant supplied from the internal condenser with the first coolant of which temperature has risen while cooling the electrical component, and condenses the refrigerant, so that the refrigerant recovers waste heat of the electrical component.

17. The heat pump system for the vehicle of claim 13, wherein
when the gas injection part operates while recovering external heat and waste heat from the electrical component in a heating mode of the vehicle,
the first branch line is opened or closed by the first valve;
in the first cooling apparatus, a first coolant is circulated in the electrical component by the first water pump;
in a state in which the second coolant line and the third coolant line are disconnected through an operation of the second valve, the second branch line is closed, and the third branch line is opened;
in the second cooling apparatus, a second coolant is circulated in the second coolant line and the opened third branch line by the second water pump;
the third cooling apparatus stops operation;
in the air conditioner, a refrigerant line connecting the heat-exchanger and the evaporator is closed by the first expansion valve;
the refrigerant connection line is closed by the second expansion valve;
the refrigerant branch line is opened by the refrigerant valve; and
in the gas injection part, the bypass line is opened by the bypass valve, the third expansion valve expands the refrigerant to supply the refrigerant to the gas-liquid separator, and the fourth expansion valve expands the refrigerant passing through the gas-liquid separator; and
the heat-exchanger recovers waste heat from the electrical component by evaporating the refrigerant expanded while passing through the fourth expansion valve, through heat-exchange between the refrigerant and the first coolant of which temperature has risen while cooling the electrical component.

18. The heat pump system for the vehicle of claim 13, wherein in a dehumidifying mode of the vehicle,
the first branch line is closed by the first valve;
in the first cooling apparatus, the first coolant is circulated in the electrical component by the first water pump;
in the second cooling apparatus, in a state in which the third branch line is opened, the second coolant is circulated in the second coolant line by the second water pump;
the third cooling apparatus stops operation;
in the air conditioner, the refrigerant line connected to the evaporator is opened by the first expansion valve;
the refrigerant connection line is closed by the second expansion valve; and
the refrigerant branch line is closed by the refrigerant valve.

19. The heat pump system for the vehicle of claim 13, wherein when cooling the electrical component, the battery module, and the autonomous driving controller,
the first branch line is closed by the first valve;
the second valve connects the second coolant line and the third coolant line, and closes the second branch line;
the third branch line is closed;
the first coolant cooled by the first radiator is supplied to the electrical component along the first coolant line by the first water pump; and
the second coolant cooled by the second radiator is supplied to the battery module and the autonomous driving controller along the second and third coolant lines by the second and third water pumps.

20. The heat pump system for the vehicle of claim 1, wherein the electrical component includes a power control device, an inverter, an on board charger (OBC), or a power converter; and
the heat-exchanger is a water-cooled heat-exchanger.

* * * * *